Sept. 8, 1959     O. L. LEIB     2,902,858
VISCOSITY METER

Filed April 14, 1955     2 Sheets-Sheet 1

INVENTOR
Otto L. Leib

Sept. 8, 1959     O. L. LEIB     2,902,858
VISCOSITY METER

Filed April 14, 1955     2 Sheets-Sheet 2

INVENTOR
Otto L. Leib

United States Patent Office 2,902,858
Patented Sept. 8, 1959

2,902,858
VISCOSITY METER

Otto L. Leib, Munich, Germany

Application April 14, 1955, Serial No. 501,321

Claims priority, application Germany April 17, 1954

2 Claims. (Cl. 73—55)

The present invention relates to a viscosity meter and, more particularly, to a through flow capillary viscosity meter.

The heretofore known capillary viscosity meters which make it possible to effect a continuous measurement of viscosity are based on the principle of the direct pressure measuring in a closed circuit in dependency on the viscosity regardless of whether such liquid pressure, which is produced by a constant volume delivery pump, is measured ahead of an individual capillary tube or in a separate closed pressure chamber. A particular disadvantage of this method consists in that the degree of efficiency of the pump is dependent on the viscosity and the lubricating ability of the liquid to be measured and that the degree of efficiency of the pump is also dependent on the wear of the pump.

With the heretofore known methods and arrangements, the above mentioned features enter into the measuring result and thus actually falsify the measured result. Moreover, with all heretofore known viscosity measuring devices, i.e., also with those viscosity measuring devices which allow a continuous measuring, it is necessary to feed an always precisely determined quantity of liquid into the viscosity meter.

It is, therefore, an object of the present invention to provide a viscosity meter which will overcome the above-mentioned drawbacks.

It is another object of this invention to provide a viscosity meter which will permit measuring the viscosity of liquids in through flow, i.e., in a continuous manner without the necessity of always feeding precisely a predetermined quantity of liquid to the viscosity meter.

It is another object of this invention to provide a viscosity meter of the type set forth above, in which the degree of efficiency of the pump feeding the liquid to be measured and the wear of the pump will not at all enter into the measuring results so that a true measurement will be possible.

These and other objects and advantages of the invention will appear more clearly from the following specification in connection with the accompanying drawings, in which.

General arrangement

Figure 1:
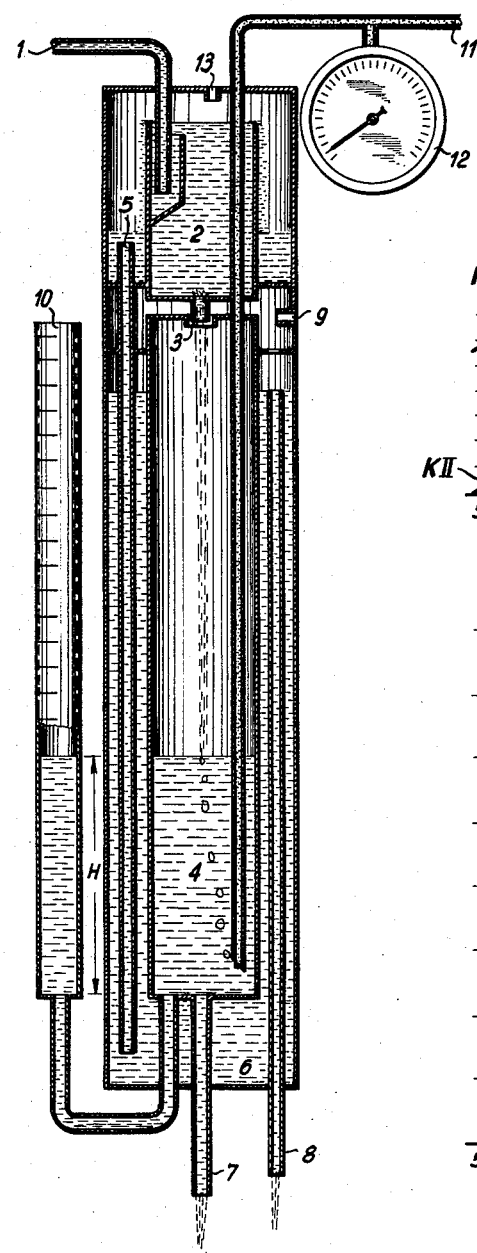
Fig. 1 is a diagrammatic illustration of a section through a viscosity meter according to the invention.

The present invention is based on the finding that the feeding of a precisely predetermined quantity of liquid, which feeding has always caused some difficulty, is not necessary any longer if the liquid is passed successively through two capillary tubes of different flow resistances. More specifically, according to the invention, the measuring is effected by passing the liquid to be measured, while said liquid is under no pressure, through at least two interconnected chambers or vessels having their bottom provided with discharge capillary tubes. The arrangement is such that the upper container or vessel is always filled up to a certain level and that the discharge capillary tube pertaining thereto allows a portion of the liquid to pass therethrough in free fall, deviating from the law by Poiseuille, whereas the lower vessel or container is provided with a discharge capillary tube meeting the law by Poiseuille so that due to the flow-through voluminae differing from each other, a liquid column is dammed up or created in said lower vessel, the level of said liquid column representing a measure for the viscosity to be measured. The flow through of the liquid to be measured through the capillary tubes is independent of the pressure and volume of the fed liquid. The upper vessel or container with its capillary tube serves to receive and limit the liquid to be measured which is fed to said container in a continuous manner. For the sake of simplicity, the said upper container or vessel will henceforth be called the feeding vessel or feeding container. The liquid which freely flows out of the respective capillary tube of the feeding vessel, henceforth called feeding tube, flows into the second vessel or container which is open and is located below said first container. For the sake of simplicity, said second container will henceforth be called measuring container. This measuring container is provided with a discharge capillary tube differing in dimension from said feeding tube. In this way, due to the changed shearing forces during the passage of the liquid through both capillary tubes, a backwash volume is formed which increases or decreases during the formation of changes in the viscosity. This backwash volume, expressed by the effective level of its surface with regard to the inlet opening of the capillary tube, serves as a measurement of the viscosity so that the measurement of the viscosity is reduced to a measuring of the liquid level in a gauge glass. This arrangement has the advantage that known indicating and control devices used for the measurement of the liquid level and the contents of the liquid may be employed, which devices, in conformity with the principle thereof, allow a gauging of the kinematic as well as dynamic viscosity.

Since, as is known, the kinematic viscosity equals the dynamic viscosity divided by density, it is possible in a continuous manner when both measurements are effected simultaneously, to ascertain the specific weight of the liquid to be measured by forming a corresponding quotient. Since, furthermore, an excess of liquid to be measured is fed to the feeding container, any desired excess feeding quantity of the liquid to be measured may be employed for controlling the temperature of the measuring device. This is of particular advantage in connection with measuring devices intended to maintain the temperature of operation in the measuring device.

Structural arrangement

Referring now to the drawings in detail and Fig. 1 thereof in particular, the arrangement shown therein comprises a conduit 1 through which the liquid to be measured is fed into the feeding container 2. This feeding container or vessel 2 is filled with liquid at an atmospheric pressure, while a partial stream of the liquid is passed through the capillary tube 3 and is conveyed to the measuring container 4. The excessive quantity of liquid passes above the upper edge of the feeding container 2 into the overflow tube 5. In order to be sure that the temperature of the liquid to be measured is maintained in the measuring device 4 and in the discharge capillary tube 7, the liquid discharged through overflow tube 5 is passed through the thermostatic chamber 6. The said portion of the liquid passes from the thermostatic chamber 6 through the overflow pipe 8. The measuring container 4 and the thermostatic chamber 6 are, through an opening 9, in communication with the normal outer air pressure. Similarly, the feeding container 2 is, through an opening 13, under normal outer air pressure. Thus, the liquid flowing out of the feeding capillary tube 3 can accumulate in the measuring container 4 without pressure other than the atmospheric pressure acting thereon. A portion of the liquid leaves the measuring container 4 through the discharge capillary tube 7 in order to be conveyed either to a place of consumption or to the starting point, whereas another portion of the liquid accumulates or is backed up as a column with the height or level thereof depending on the viscosity of the liquid. This level or height is measured, registered or conveyed to a control device, either by means of a gauge glass or measuring cylinder 10 in a manner known per se or by blowing in air or a protective gas through pipe 11, while a fine pressure gauge 12, or instead thereof, a diagram writer communicates with pipe 11. In this way, the kinematic viscosity is indicated at the gauge glass. The fine pressure gauge 12 measures the counter-pressure of the measuring liquid in the measuring container 4, and thus the dynamic viscosity because the specific weight of the liquid enters the measuring operation.

Figure 2:
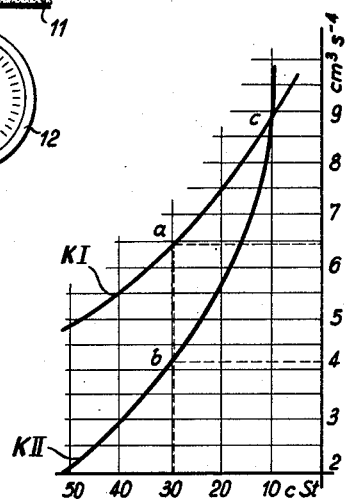
Fig. 2 represents a graph showing the conditions prevailing during a flow of the liquid to be measured through the viscosity meter.

Of particular importance for measuring is the particular dimensioning of the capillary tubes 3 and 7. Fig. 2 illustrates, in connection with two different capillary tubes, the relationship between the discharge voluminae and the viscosity and the possibility of measuring the viscosity as resulting therefrom. For the example shown in Fig. 2, the following conditions are assumed: The cross-section of the discharge capillary tube 7 is about 1.5 times greater than that of the feeding capillary tube 3, whereas the length of the discharge capillary tube 7 is about twenty times that of the feeding capillary tube 3. Thus, while the feeding capillary tube 3 is relatively short and narrow, the discharge capillary tube is relatively long and wide, the term "relatively" being selected because, according to the particular measuring problem involved, numerous possibilities of variation exist. The feeding container 2 may have a desired constant height corresponding to the desired measuring range, which height is essential for the maintenance of the laminar flow of the liquid being fed. By selecting the feeding capillary tube 3 short, a considerable deviation of the shearing forces between the lines of the liquid inside said capillary tube from the law of Poiseuille is effected because a portion of the liquid to be measured leaves the capillary tube in free fall. When the viscosity is double, thus in deviation from the law, not half of the volume flows out of the capillary tube 3 but considerably more as illustrated by the graph KI of Fig. 2, which graph has been drawn up in conformity with measurements effected.

In the discharge capillary 7 of Fig. 1 which meets the law of Poiseuille, considerably greater shearing forces appear as illustrated by the graph KII (Fig. 2) so that there exists a considerable difference between the quantities of liquids being fed per time unit to the container 4 and the quantities of liquids to be discharged therefrom. With reference to the example illustrated in Fig. 2, point $a$, a volume of 6.4 cubic meters per second passes through the feeding capillary 3 at a viscosity of 30 centistokes, whereas the discharge capillary 7 according to point $b$ at the same viscosity allows a volume of 4.2 cubic meters per second to pass only.

Figure 3:
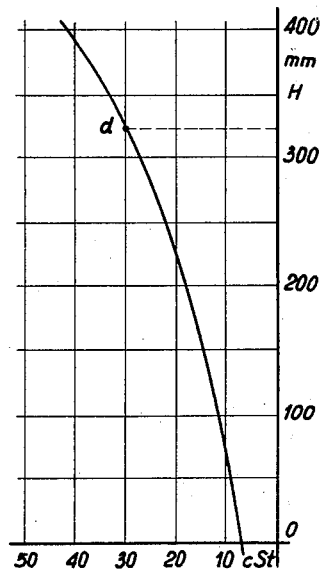
Fig. 3 is a gauge graph of the meter according to the invention.

Therefore, an excessive remaining volume backs up in the measuring container 4 until the potential energy of the liquid column is sufficiently high in order automatically to displace the flowing-in liquid volume $a$ through the discharge capillary 7. The level of the liquid column H (Fig. 1) consequently varies in conformity with the viscosity. The measurement showed a level of H equaling 322 millimeters. Fig. 3 shows a gauging glass. Point $d$ is the gauging point for the viscosity of 30 cst. Depending upon the type of dimensioning of the capillary tubes, these tubes will, at a certin viscosity, have the same discharge volume, point $c$ (Fig. 2), for instance, at 12.5 cst., whereupon the situation is inverted so that the longer capillary tube allows a larger volume to discharge, so that it is possible up to the start of the capillary tube at the bottom of the measuring container 4 to measure without losses.

The arrangement according to the invention is independent of the pressure of the liquid being fed and is solely dependent on a pressure free passage of the liquid through the containers arranged one above the other.

If the liquid to be measured is under a high or low pressure, the measuring device may be surrounded by a pressure tight mantle, the interior of which is maintained under pressure, which latter corresponds to the initial pressure of the liquid to be measured so that the air discharge openings 9, 10, and 13 will at all points make possible an equalization according to said initial or starting pressure.

Figure 4:
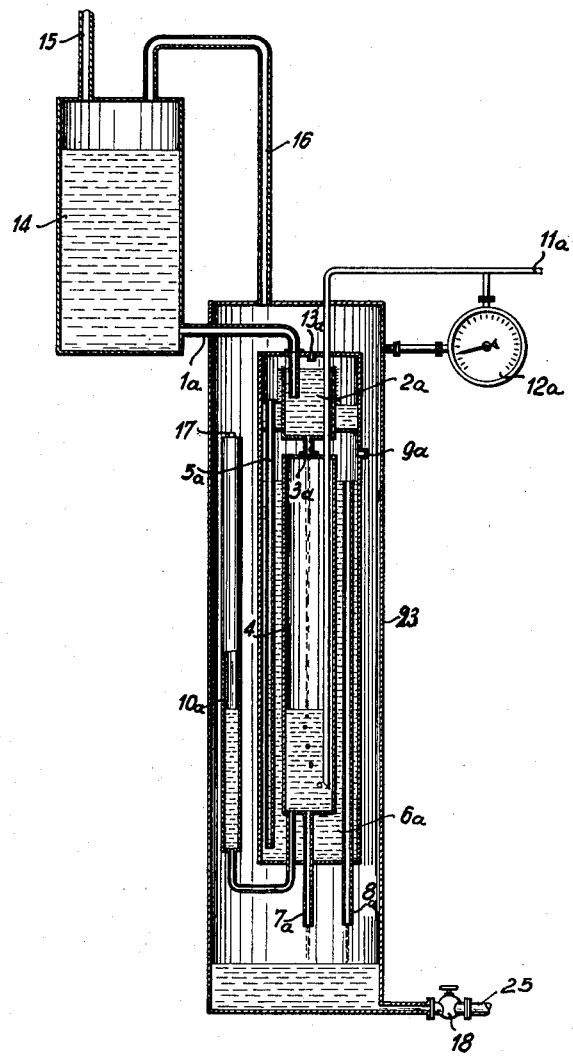
Fig. 4 illustrates a section similar to that of Fig. 1 but with additional means for effecting the measuring of the viscosity of a liquid which is under a pressure higher than the atmospheric pressure or under a pressure below atmospheric pressure.

A corresponding arrangement is shown in Fig. 4 in which those parts corresponding to similar parts of Fig. 1 are designated with the same reference numerals, however, with the additional letter $a$. The pressure mantle 23 surrounds the entire arrangement as shown in Fig. 4. The liquid to be measured is in a reservoir 14 in which it is placed under a high or low pressure by means of a conduit 15 connected to a suction or pressure pump (not shown). The gas or air chamber in the reservoir 14 communicates with the interior of the mantle 23 through the intervention of a pipe 16. By means of the openings 9a, 13a and 17a, all chambers above the liquid in the measuring device communicate with the interior of the mantle 23 so that at all points the same pressure is effective and the measuring itself is not affected by pressure. The liquid flowing out from the capillary tube 7a and the overflow tube 8a collects in the lower portion of the mantle 23 and may be discharged through a tube 25 provided with a shut-off valve 18.

It is, of course, understood that the present invention is by no means limited to the particular constructions shown in the drawings, but also comprises any modifications within the scope of the appended claims.

What I claim is:

1. A viscosimeter which includes in combination: an upper container arranged to be maintained filled up to a predetermined level with the liquid to be measured, a lower container arranged between said upper container and in spaced relationship thereto, a first discharge capillary tube connected to the bottom of said upper container for discharging liquid from said upper container through said first tube in a turbulence-free manner into said lower container while allowing the liquid to drop from the mouth of said tube in free fall into said lower container whereby the quantity of liquid being discharged through said first tube will be dependent on the viscosity of the liquid only, a second discharge capillary tube connected to the bottom of said lower container for discharging liquid therefrom, said capillary tubes being dimensioned so that the flow resistance offered by said first capillary tube is less than the flow resistance offered by said second capillary tube so that a column of liquid of such a height will build up in said lower container that the quantities of liquid discharged per time unit through each of said capillary tubes are the same, jacket means surrounding said containers and arranged to receive liquid from said first container in excess of a predetermined quantity of liquid in said first container, and overflow means arranged within said jacket means for discharging liquid therefrom in excess of a predetermined maximum liquid level therein.

2. In combination in a viscosimeter: a reservoir arranged to receive liquid the viscosity of which is to be measured, means communicating with said reservoir and arranged to subject liquid in said reservoir to a pressure different from atmospheric pressure, a substantially gas-tight first jacket, conduit means conecting said reservoir above the level of the liquid in said reservoir with said first jacket to convey to said first jacket the pressure acting upon the liquid in said reservoir, a first liquid receiving container arranged within said first jacket, a second liquid receiving container arranged within said first jacket below said first liquid receiving container in spaced relationship thereto, liquid conveying means for conveying liquid from said reservoir into said first liquid receiving container, a first liquid conveying capillary tube arranged to convey liquid from said first liquid receiving container into said second liquid receiving container while allowing the liquid to drop in free fall from said tube into said second container, a second liquid conveying capillary tube arranged to discharge liquid from said second liquid receiving chamber into said first jacket, a second jacket arranged within said first jacket and surrounding said first and second liquid receiving containers, overflow means arranged in said containers to prevent the level of liquid in said second jacket from exceeding a predetermined maximum level, and means establishing communication between the interior of said first jacket and the interior of said second jacket above said predetermined maximum liquid level therein, said first and second liquid conveying means being designed respectively to offer different resistance to the liquid flow therethrough so as to cause the liquid in said second container to back up to form a liquid column until equalization has been obtained between the quantity of liquid passing per time unit from said first liquid receiving container to said second liquid receiving container and the quantity of liquid being discharged per time unit from said second liquid receiving container, and liquid receiving gauge means communicating with the liquid-filled portion of said second container for indicating the liquid level of the latter, thereby indicating the viscosity of the liquid in said second container.

References Cited in the file of this patent

UNITED STATES PATENTS

| | | |
|---|---|---|
| 1,178,193 | Trimbey | Apr. 4, 1916 |
| 1,720,159 | Willmann | July 9, 1929 |
| 1,822,458 | Rowland et al. | Sept. 8, 1931 |
| 1,919,921 | Anderson et al. | July 25, 1933 |
| 1,925,833 | French | Sept. 5, 1933 |
| 1,965,781 | Ritnour | July 10, 1934 |
| 2,131,379 | Lay | Sept. 27, 1938 |
| 2,712,752 | Hage | July 12, 1955 |

FOREIGN PATENTS

| | | |
|---|---|---|
| 573,828 | Germany | Apr. 6, 1933 |